T. M. OWEN.
SEPARATION OF METALLIC SULFIDS FROM ORES.
APPLICATION FILED FEB. 27, 1914.
1,157,176.
Patented Oct. 19, 1915.
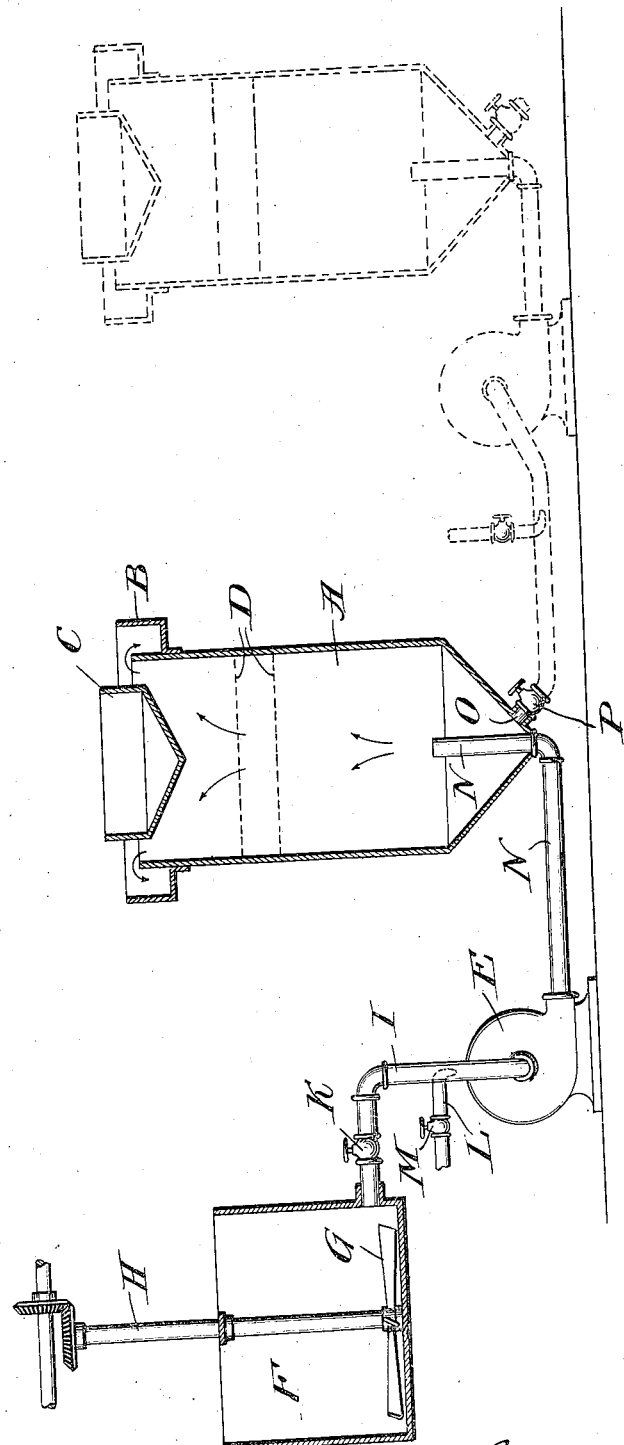
Witnesses
Inventor
T. M. Owen
By G. Croydon Marks
Attorney

UNITED STATES PATENT OFFICE.

THOMAS MACKELLAR OWEN, OF SYDNEY, NEW SOUTH WALES, AUSTRALIA, ASSIGNOR TO EDWARD WILLIAM CULVER, OF SYDNEY, NEW SOUTH WALES, AUSTRALIA.

SEPARATION OF METALLIC SULFIDS FROM ORES.

1,157,176.  Specification of Letters Patent.  Patented Oct. 19, 1915.

Application filed February 27, 1914. Serial No. 821,473.

*To all whom it may concern:*

Be it known that I, THOMAS MACKELLAR OWEN, subject of the King of Great Britain and Ireland, residing at 116 Clarence street, Sydney, New South Wales, Australia, late of Broken Hill, in said State, have invented certain new and useful Improvements in the Separation of Metallic Sulfids from Ores, of which the following is a specification.

This invention relates to the preferential or selective separation by froth flotation of mixed metallic sulfids from ores containing them, and in particular to the preferential or selective separation of lead sulfids (galena) and zinc sulfids (blende).

The process though primarily useful in the treatment of weathered slimes is applicable to slimes and like ore products generally and the term "slimes" is used in this specification to include all such products.

The process is based on the discovery that small quantities of certain manganese salts applied to the slimes alter or modify their behavior in flotation treatment so that the sulfids may be obtained separately, that is to say, so that separate products may be obtained each of which respectively is relatively high in one particular sulfid and relatively low in other sulfids.

In the froth flotation treatment of mixed sulfid ores containing, for instance, lead, copper, zinc, and iron sulfids, or any two or three of those sulfids, the introduction of a small quantity of an alkaline permanganate into contact with the slimes makes the flotation action selective in the case of a large range of representative slimes. In the case of lead-zinc slimes the galena and the blende are raised in successive order; the galena is floated first, the bulk of the silver (if present) accompanying the galena, and the blende is subsequently floated from the residue after acid has been added to the pulp. If copper is present it usually comes up with the lead.

The proportion of alkaline permanganate required is less than the quantity which would be necessary to change permanently the reducing character of the mass of the pulp. Relatively minute quantities of free alkaline permanganate will substantially affect the behavior of certain metallic sulfids in the flotation liquor.

My process depends upon change of characteristics in the slime constituents and requires that the permanganate shall, before or during its dissociation, act on the slimes. The pretreatment of the water used in sulfid flotation processes by the addition thereto of alkaline permanganates such as potassium permanganate in sufficient quantity to neutralize its reducing quality does not procure the same effects.

In operating my process it is most advantageous to add the alkaline permanganate after the slimes have been mixed with the flotation liquor; if added to the liquor before the liquor is brought into contact with the slimes more or less of the alkaline permanganate is wasted in reacting with reducing elements contained in the water, which must be satisfied before alkaline permanganate is available for acting on the slimes constituents; and this wasteful excess of permanganate has the effect of more quickly sickening the circuit liquor. (Manganese dioxid may be used to procure effects of the same order as alkaline permanganates.)

The pulp usually contains from three to four weights of water for every one weight of slimes, but experiment has demonstrated that this proportion may be substantially varied, as the effectiveness of the process does not depend upon any certain fluidity of pulp within extreme limits, so long as a freely flowing pulp is used, as in known sulfid flotation processes.

In this specification the term "pulp" is used to designate the mixture of slimes and water.

The frothing agent most suitable for use in practice is eucalyptus oil, but I do not confine myself to the use of eucalyptus oil as a frothing agent.

The effectiveness of the process is not normally dependent upon its conduct at a certain critical temperature, and my experiments indicate that it may be conducted in practice at any normal atmospheric temperature or at an elevated temperature. When, however, the slimes are of a highly reducing character and act to very rapidly decompose the permanganate, it is advantageous to conduct the process at a temperature approximately 120° F.

In order to determine the quantity of potassium permanganate or other alkaline permanganate, or manganese dioxid, required to procure the best effect, a closed series of tests may be made. As every ore and ore product varies more or less in constitution, a definite proportion applicable with best effect cannot be specified for general uses without reference to the nature of the material to be treated. By way of example, however, I quote the case of a weathered slime obtained from the treatment of an ore obtained at Broken Hill, New South Wales, said slime containing approximately by assay 16% lead, 13½% zinc, and 17 oz. silver per ton. In this treatment, using 2½ lbs. of potassium permanganate, and 3 oz. of eucalyptus oil per ton of slimes, a lead concentrate was obtained containing: 60.5% lead, 54 oz. silver and 11.8% zinc, and, after adding 15 lbs. of sulfuric acid per ton of original slimes, a zinc concentrate containing 6.2% lead, 11.2 oz. silver, and 43.4% zinc, leaving a residue containing 2.0% lead, 3.0 oz. silver, and 1.6% zinc.

In some cases I find it advantageous to introduce into the pulp a salt which has the effect of "deadening" the flotative properties of certain constituents of the slimes. Such "deadening" agents are well known and are in use. It is advantageous to modify the action of the flotation medium in this way, particularly when retreating fine mixed slime concentrates, for the purpose of obtaining the lead and zinc separately. In practice I prefer to use sodium hydrate, adding it in the proper proportions to the pulp, digesting, adding the alkaline permanganate, and then adding a frothing agent and subjecting the pulp to froth flotation (without using acid) to obtain a float relatively high in lead. The residues containing zinc may if required be retreated by froth flotation with acid for the recovery of zinc.

In carrying out my said invention upon a weathered slime of the constitution previously defined, obtained at Broken Hill Junction North mine, New South Wales, I proceed by introducing the slime into substantially fresh water free from acid; agitate; add free potassium permangante; add the frothing agent to the pulp (which contains usually 3–4 parts by weight of water to one part of slime); and then submit the mixture to froth flotation according to known practice (without acid), with the result that the lead sulfids float, as also does the silver present, leaving the zinc in the residue. The residue is then resubmitted to froth flotation, after acid, (about 15 lbs. sulfuric acid per ton of slimes), has been added thereto, with the result that the zinc is floated.

If acid in any material quantity be added to the pulp before the lead is separated the selective effect is not procured and the zinc is flotated with the lead and silver, a collective float instead of a selective float being obtained, which (collective) result is not the object of my invention.

In practice it is desirable to circulate the treatment liquor. In this event I take care to preserve the lead flotation liquor as far as practicable from contamination with the zinc flotation liquor. For this purpose I arrange to use two storage tanks. The first tank I keep replenished with fresh water, and return to it the liquor decanted after flotation of the lead. From the second tank is drawn the liquor for retreatment of the deleaded slimes for zinc separation, and the waste liquor is returned to this tank after the zinc has been floated. There are thus two circuit liquors used, the first one being maintained clear of the second; a small quantity of the first circuit liquor is carried into the second liquor, but that is of no consequence. If only one circuit liquor were used for all the operations, the successful results otherwise attainable would be minimized.

Though all the steps in the process may be conducted with the same liquor, replenished to make good the losses, it is found that repeated reuse of the one body of liquor is undesirable.

I find in operating the process in circuit, that the circuit liquor becomes aged after repeated flotations, and then displays a tendency to bring a higher proportion of zinc into the lead float, thus reducing the grade of the lead concentrate obtained.

Accumulation of reducing salts from the slimes in the circuit liquor when used repeatedly minimizes the efficiency of the separation of the first flotation products. It is therefore desirable to keep the first tank replenished with fresh water. It is undesirable and wasteful to neutralize these reducing salts by adding oxidizing reagents; by doing so the same valuable effects would not be procured as are obtained by the use of fresh water in the make-up of the first pulp.

In certain cases, which cannot be definitely classified, I have found the process commercially ineffective for the selective separation of copper and iron, though in many other cases I have found it profitable to use it for the separation of those products. In every case therefore it needs to be determined by simple laboratory test whether a particular copper-iron slime is subject to commercially successful treatment by the process.

In the case of many slimes it is found that a preliminary weathering even of a few hours duration insures better results in operating the process, and it is therefore desirable to make tests to determine in particular cases if such preliminary weathering treatment is advantageous.

The physical effects which occur in flotation treatment of mixed sulfids are irregular and imperfectly understood, as is well recognized, and it is hence necessary to determine by laboratory tests the characteristics of particular slimes before submitting them to treatment on a commercial scale.

It is desirable in making tests for any of the purposes beforementioned that wet or damp slimes should be treated. Commercially, the slimes requiring treatment are in a damp or wet condition. A test on slimes which have been dried will not necessarily give effective results, where, under the same conditions, an undried slime may show satisfactory behavior in the process.

Referring now to the drawing, which illustrates more or less diagrammatically on a convenient and suitable form of apparatus for carrying out the improved process, the plant consists of a receptacle A open at the top end and pointed or coned at the bottom. At the top of this vessel is attached launder B into which the concentrate overflows and is collected. Into the top of the vessel can be placed, if required, a baffle, or set of baffles, for the purpose of restricting the area of the overflow. Such a baffle is shown at C. At any suitable position in the vessel can be placed one or more screen plates D, for the purpose of steadying down the swirling actions, or currents, caused by the agitation of the pump E hereinafter described. The presence of these screens is an advantage but it is not essential. A vessel F, of a suitable size is also provided in which the ore pulp can be given a bath or preliminary treatment, with the permanganate before delivery into the vessl A. The vessel F can consist of a containing tank in which are placed stirring arms G, fixed to a shaft H arranged with means to revolve at suitable speeds. An opening is provided in the lower part of the vessel F to which is connected one end of a pipe I, connecting at its other end to a centrifugal pump E. A valve K is placed in the pipe I and the rate of flow of the pulp from the vessel F to the pump E, is regulated thereby. Into the pipe I between the valve K and the pump E projects a small pipe L with a control valve M, this pipe and valve being for the purpose of admitting air in any desired quantities. The pipe L is connected either to the open atmosphere or to a supply of compressed air. Only one of these connections of course would be used at any one time, the choice being decided by the requirements of the plant. The outlet side of the pump E is connected to the vessel A by the pipe which extends some distance up into the vessel A through the bottom thereof as shown. The pulp is drawn from the vessel F into the pump E and in its passage through the pipe I the flow either sucks in through the valve M and pipe L the requisite quantity of air, or else the requisite quantity of air is forced in from the compressed air supply. The frothing agent is added either to the vessel F or through the air pipe. The action of the pump is to churn the mixture of pulp, air and frothing agent together and then to deliver the mass into the vessel A. Here the air rises to the surface carrying with it the lead sulfid particles, when running for lead recovery; and the zinc sulfid particles, when running for zinc recovery. The tailing, or reject product, in either case sinks to the bottom of the vessel A and is drawn off through the pipe O the rate being regulated by the valve P.

The tail pipe O can connect through another pump (or pumps) to another vessel (or series of vessels) as indicated in the dotted portion of the drawing; in which case the operations performed in the vessel A can be repeated until the tailing is either sufficiently free from lead to go on to the zinc treatment or else sufficiently free from both lead and zinc, or other valuable metals, to be run to waste.

What I claim as my invention and desire to secure by Letters Patent is:—

1. In selective or preferential froth flotation separation of metallic sulfids from slimes, the herein described process for augmenting the flotative quality of certain sulfids in relation to certain other sulfids, which consists in adding to and agitating with the pulp a limited proportion of alkaline permanganate.

2. The herein described improved process of preferential or selective froth flotation of lead and zinc sulfids, which consists in subjecting slimes to contact with alkaline permanganate in solution, agitating the slimes in water containing a flotation medium, removing the leady float concentrate, adding acid, re-agitating and removing the zincy float concentrate.

In testimony whereof I have affixed my signature in presence of two witnesses.

THOMAS MACKELLAR OWEN.

Witnesses:
 W. I. Sprusar,
 Harold A. Rorke.